US012607730B2

(12) United States Patent
Gagne et al.

(10) Patent No.: US 12,607,730 B2
(45) Date of Patent: \*Apr. 21, 2026

(54) TECHNIQUES FOR SCAN PATTERN BEAM ALIGNMENT

(71) Applicant: AEVA, INC., Mountain View, CA (US)

(72) Inventors: Keith Gagne, Santa Clara, CA (US); Bradley Scot Levin, San Jose, CA (US)

(73) Assignee: AEVA, INC., Mountain View, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 18/601,825

(22) Filed: Mar. 11, 2024

(65) Prior Publication Data

US 2024/0248187 A1 Jul. 25, 2024

Related U.S. Application Data

(63) Continuation of application No. 17/839,311, filed on Jun. 13, 2022, now Pat. No. 11,927,701, which is a continuation of application No. 17/485,838, filed on Sep. 27, 2021, now Pat. No. 11,360,198.

(51) Int. Cl.
| | |
|---|---|
| *G01S 7/48* | (2006.01) |
| *G01S 7/481* | (2006.01) |
| *G01S 7/497* | (2006.01) |
| *G01S 17/42* | (2006.01) |

(52) U.S. Cl.
CPC .......... *G01S 7/4972* (2013.01); *G01S 7/4816* (2013.01); *G01S 7/4817* (2013.01); *G01S 17/42* (2013.01)

(58) Field of Classification Search
USPC ...................................................... 356/5.01
See application file for complete search history.

(56) References Cited

U.S. PATENT DOCUMENTS

| | | | |
|---|---|---|---|
| 4,901,109 A | 2/1990 | Mitome et al. | |
| 6,519,099 B1 | 2/2003 | Blair et al. | |
| 6,661,951 B1 | 12/2003 | Blair et al. | |
| 6,663,296 B1 | 12/2003 | Blair et al. | |
| 6,758,611 B1 | 7/2004 | Levin et al. | |
| 6,793,406 B1 | 9/2004 | Edwards et al. | |
| 6,795,461 B1 | 9/2004 | Blair et al. | |
| 6,893,170 B1 | 5/2005 | Edwards et al. | |
| 11,360,198 B1 | 6/2022 | Gagne et al. | |
| 11,927,701 B2 * | 3/2024 | Gagne .................. | G01S 7/4972 |
| 2011/0164783 A1 | 7/2011 | Hays et al. | |
| 2012/0050750 A1 | 3/2012 | Hays et al. | |
| 2012/0169053 A1 | 7/2012 | Tchoryk, Jr. et al. | |
| 2012/0274937 A1 | 11/2012 | Hays et al. | |
| 2013/0314694 A1 | 11/2013 | Tchoryk, Jr. et al. | |
| 2018/0156609 A1 | 6/2018 | Kimura | |
| 2019/0094346 A1 | 3/2019 | Dumoulin et al. | |
| 2020/0003556 A1 | 1/2020 | Kimura | |
| 2020/0124711 A1 | 4/2020 | Rezk et al. | |
| 2020/0319314 A1 | 10/2020 | Behzadi et al. | |

* cited by examiner

*Primary Examiner* — James R Hulka
(74) *Attorney, Agent, or Firm* — Womble Bond Dickinson (US) LLP

(57) ABSTRACT

A light detection and ranging (LIDAR) system includes a plurality of optical sources to generate a plurality of optical beams and at least one optical component adjustable to shift the plurality of optical beams to align with a reference output beam pattern prior to propagating to output scanning optics.

20 Claims, 7 Drawing Sheets

401

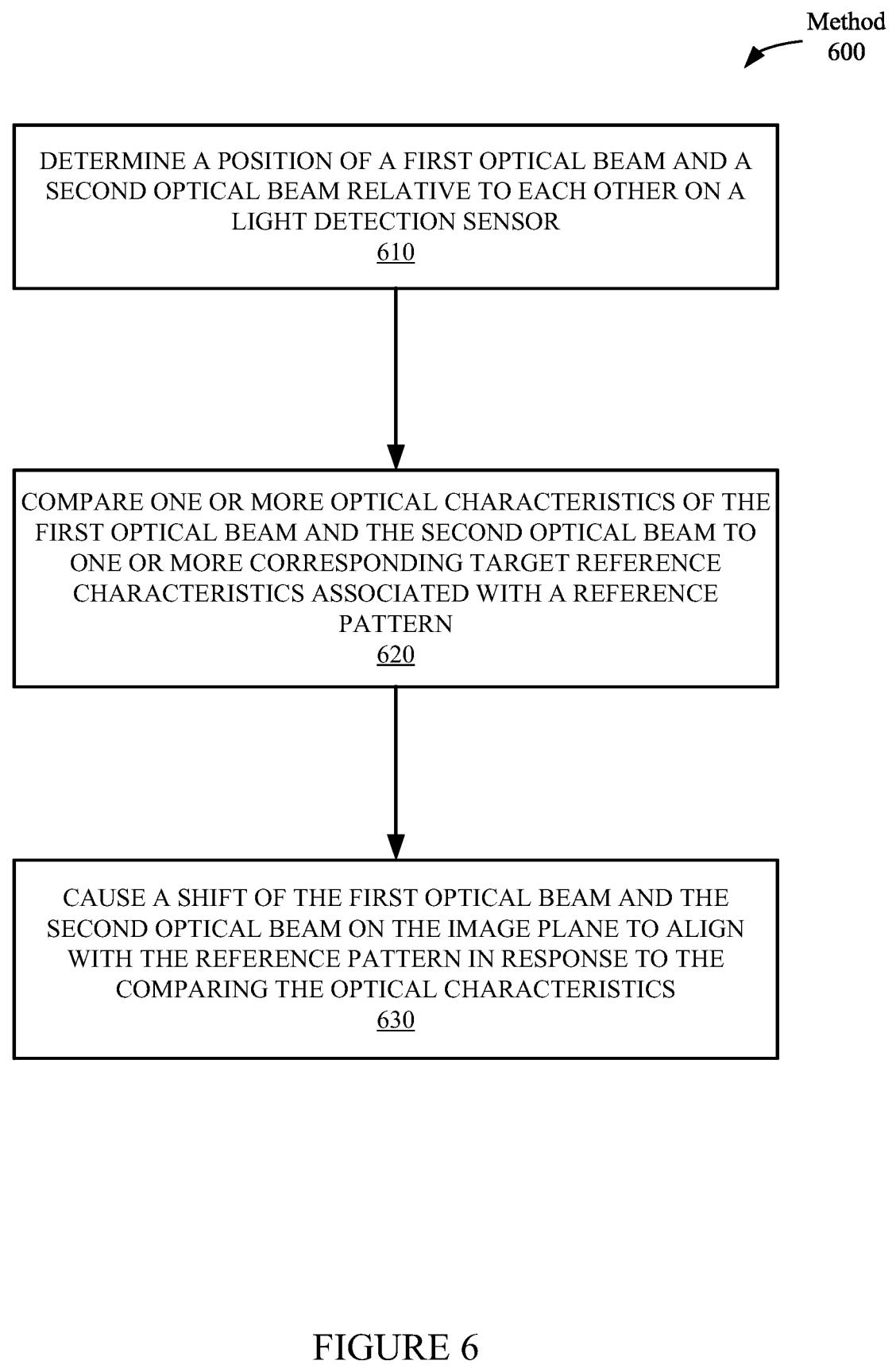

Method
600

DETERMINE A POSITION OF A FIRST OPTICAL BEAM AND A
SECOND OPTICAL BEAM RELATIVE TO EACH OTHER ON A
LIGHT DETECTION SENSOR
610

COMPARE ONE OR MORE OPTICAL CHARACTERISTICS OF THE
FIRST OPTICAL BEAM AND THE SECOND OPTICAL BEAM TO
ONE OR MORE CORRESPONDING TARGET REFERENCE
CHARACTERISTICS ASSOCIATED WITH A REFERENCE
PATTERN
620

CAUSE A SHIFT OF THE FIRST OPTICAL BEAM AND THE
SECOND OPTICAL BEAM ON THE IMAGE PLANE TO ALIGN
WITH THE REFERENCE PATTERN IN RESPONSE TO THE
COMPARING THE OPTICAL CHARACTERISTICS
630

FIGURE 6

TECHNIQUES FOR SCAN PATTERN BEAM ALIGNMENT

CROSS-REFERENCE TO RELATED APPLICATIONS

This application is a continuation of U.S. application Ser. No. 17/839,311, filed on Jun. 13, 2022, which is a continuation of U.S. application Ser. No. 17/485,838, filed on Sep. 27, 2021, which issued on Jun. 14, 2022 as U.S. Pat. No. 11,360,198, which are hereby incorporated by reference.

FIELD

The present disclosure is related to light detection and ranging (LIDAR) systems in general, and more particularly to optical beam alignment.

BACKGROUND

Frequency-Modulated Continuous-Wave (FMCW) LIDAR systems use tunable lasers for frequency-chirped illumination of targets, and coherent receivers for detection of backscattered or reflected light from the targets that are combined with a local copy of the transmitted signal (LO signal). Conventional LIDAR systems require high frame rates and an increased number of scanning points typically achieved by using multiple numbers of optical sources to emit optical beams. The optical sources may be placed in a one-dimensional or two-dimensional array separated by some distance, referred to as pitch. The array of optical sources may share a single output lens. The single output lens provides angular separation between collimated optical beams to create discrete lines after reaching the scanner of the LIDAR system. Using the single output lens for multiple optical beams may reduce the cost form factor of the system in comparison to adding additional output lenses. However, the angular separation tolerance between the sources after the output lens is critical. To achieve a high resolution scan pattern, this tolerance must be controlled.

SUMMARY

The present disclosure describes various examples of LIDAR systems and methods for optical beam alignment.

In one example, an optical alignment system includes a first optical source to provide a first optical beam, a second optical source to provide a second optical beam, and a light detection sensor to detect a position of the first optical beam and the second optical beam relative to each other and to a reference pattern on a light detection sensor. The optical alignment system further includes alignment optics between the light detection sensor and the first optical source and the second optical source, the alignment optics may include one or more optical components adjustable to shift each optical beam on the light detection sensor. Further, the optical alignment system includes a control system coupled to the alignment optics and the light detection sensor, where the control system causes the alignment optics to shift the first optical beam and the second optical beam on the light detection sensor according to the reference pattern.

The control system of the optical alignment system to cause the alignment optics to shift the first optical beam and the second optical beam on the light detection sensor according to the reference pattern further compares one or more optical characteristics of the first optical beam and the second optical beam to one or more corresponding target reference characteristics associated with the reference pattern. The reference pattern may include coordinates on the light detection sensor corresponding to a first reference position of the first optical beam and a second reference position of the second optical beam. The control system coupled to the light detection sensor is further to determine coordinates corresponding to a first detected position of the first optical beam and a second detected position of the second optical beam on the light detection sensor, and determine a first difference between the first reference position and the first detected position and determine a second difference between the second reference position the second detected position. The control system communicates the first difference and the second difference to the alignment optics to shift the first optical beam and the second optical beam to align with the first reference position and the second reference position, accordingly.

In one example, the reference pattern may include a collinear pattern of four points or some coplanar pattern. The alignment optics may include a first optical component to shift the first optical beam and a second optical component to shift the second optical beam in response to at least one control signal. In one embodiment, the at least one control signal is received from the control system.

In one embodiment, the light detection sensor is movable between a first location and a second location between an output lens and an optical scanner. The light detection sensor to provide the control system a first position of the first optical beam and a second position of the second optical beam imaged on the light detection sensor at the first location, and to provide a third position of the first optical beam and a fourth position of the second optical beam on the light detection sensor at the second location, wherein the first location and the second location of the light detection sensor is between the output lens the optical scanner. The control system to cause the alignment optics to shift the first optical beam and the second optical beam based on a first angle of the first optical beam and a second angle of the second optical beam relative to the light detection sensor at the first location and a third angle of the first optical beam and a fourth angle of the second optical beam relative to the light detection sensor at the second location.

In one embodiment, the control system to cause the alignment optics to shift may determine the first angle based on a distance between the first location and the second location of the light detection sensor, and the distance between the first position on the light detection sensor of the first optical beam at the first location and the third position on the light detection sensor of the first optical beam at the second location. The control system may determine the second angle by the distance between the first location and the second location of the light detection sensor, and the distance between the second position on the light detection sensor of the second optical beam at the first location and the fourth position on the light detection sensor of the second optical beam at the second location.

The method may include determining a position of a first optical beam and a second optical beam relative to each other on the light detection sensor, comparing one or more optical characteristics of the first optical beam and the second optical beam to one or more corresponding target reference characteristics associated with a reference pattern, and shifting the first optical beam and the second optical beam on the light detection sensor to align with the reference pattern in response to the comparing.

Implementations may include one or more of the following features. The method where the target reference characteristics of the reference pattern may include coordinates on the light detection sensor corresponding to a first reference position of the first optical beam and a second reference position of the second optical beam. The method may include determining coordinates corresponding to a first detected position of the first optical beam and a second detected position of the second optical beam on the light detection sensor. The comparing of the one or more optical characteristics further may include determining a first difference between the first reference position and the first detected position and determine a second difference between the second reference position the second detected position, and the shifting of the first optical beam and the second optical beam further may include shifting the first optical beam and the second optical beam to align with the first reference position and the second reference position based on the first difference and the second difference. The method may further include providing a third optical beam and a fourth optical beam and shifting the first optical beam, the second optical beam, the third optical beam, and the fourth optical beam on the light detection sensor according to the reference pattern, wherein the reference pattern is comprised of a coplanar pattern of four points.

In one embodiment, the method further includes providing an output lens for directing the first optical beam and the second optical beam to a scanner, determining a first position of the first optical beam and a second position of the second optical beam imaged on the light detection sensor at a first location, determining a third position of the first optical beam and a fourth position of the second optical beam on the light detection sensor at a second location, and shifting the first optical beam and the second optical beam based on a first angle of the first optical beam and a second angle of the second optical beam relative to the light detection sensor at the first position and a third angle of the first optical beam and a fourth angle of the second optical beam relative to the light detection sensor at the second position.

One aspect of the disclosure includes a light detection and ranging (LIDAR) system. The LIDAR system includes one or more optical sources to provide a first optical beam and a second optical beam directed toward an output lens, an image processing system including a light detection sensor to detect a position of the first optical beam and the second optical beam relative to each other and to a reference pattern on the light detection sensor; optical circuits may include alignment optics between the light detection sensor and the first optical source and the second optical source. The LIDAR system further includes the alignment optics including one or more optical components adjustable to shift each optical beam on the light detection sensor. The LIDAR system may include a LIDAR control system including one or more processors coupled to the optical circuits and the image processing system, where the LIDAR control system causes the alignment optics to shift the first optical beam and the second optical beam on the light detection sensor according to the reference pattern. Implementations may include one or more of the following features. The LIDAR control system further to cause the alignment optics to shift the first optical beam and the second optical beam on the light detection sensor according to the reference pattern is further to compare one or more optical characteristics of the first optical beam and the second optical beam to one or more corresponding target reference characteristics associated with the reference pattern. The alignment optics may include a first optical component to shift the first optical beam and a second optical component to shift the second optical beam in response to at least one control signal from the LIDAR control system.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of the various examples, reference is now made to the following detailed description taken in connection with the accompanying drawings in which like identifiers correspond to like elements.

FIG. 6 is a flow diagram of an example method for utilizing components of a LIDAR system.

DETAILED DESCRIPTION

Figure 1:
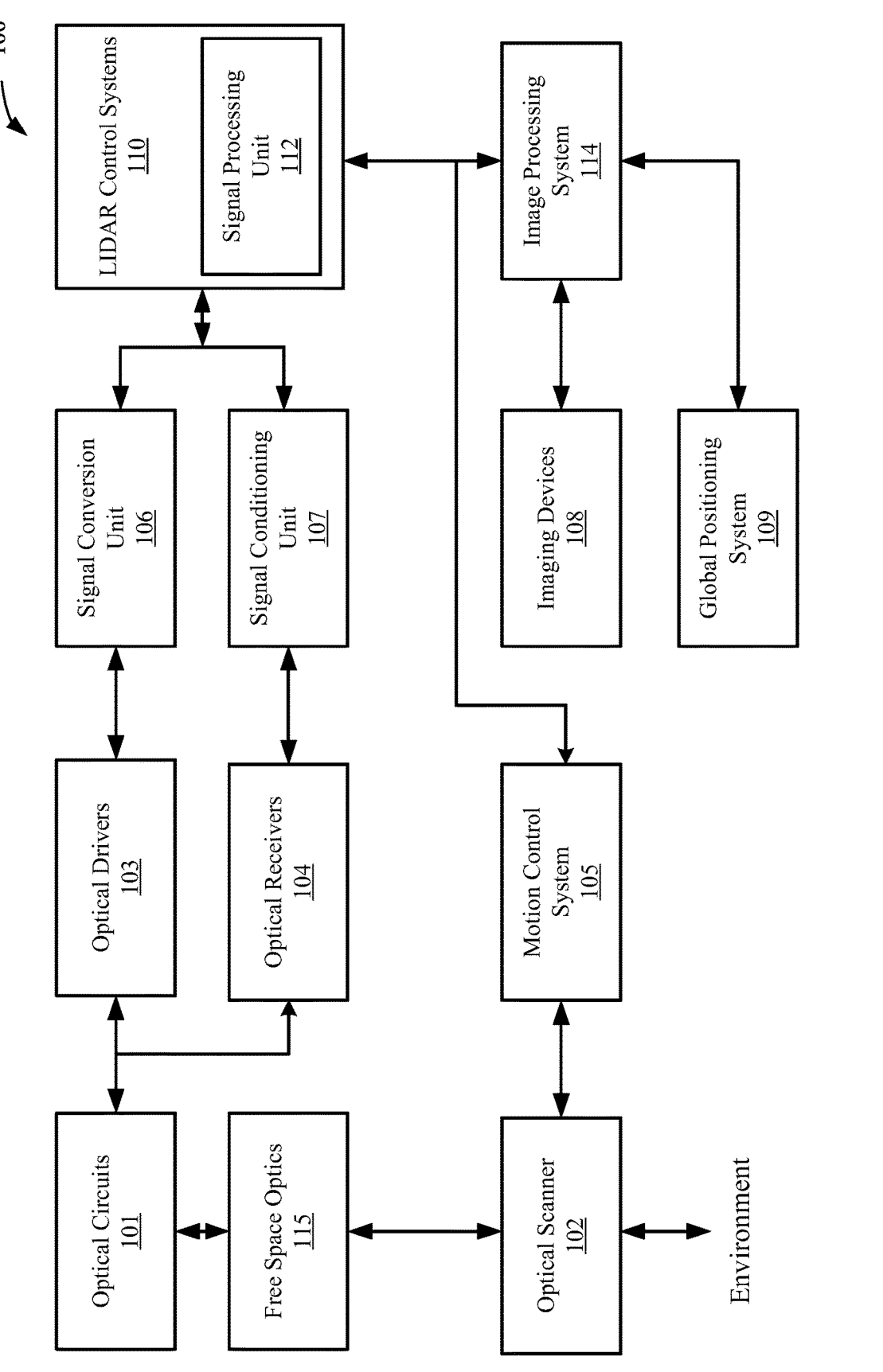
FIG. 1 illustrates a LIDAR system 100 according to example implementations of the present disclosure.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the spirit and scope of the embodiments.

The present disclosure describes various examples of LIDAR systems and methods for optical beam adjustment. According to some embodiments, the described LIDAR system described herein may be implemented in any sensing market, such as, but not limited to, transportation, manufacturing, metrology, medical, virtual reality, augmented reality, and security systems. According to some embodiments, the described LIDAR system is implemented as part of a front-end of frequency-modulated continuous-wave (FMCW) device that assists with spatial awareness for automated driver assist systems, or self-driving vehicles.

As discussed above, Conventional LIDAR systems require high frame rates and an increased number of scanning points typically achieved by using multiple numbers of optical sources to emit optical beams. However, when collimating beams in an irregular array, due to tolerances, manufacturing imperfections, and the like, the pattern that is created is irregular. For example, if the optical beams travel along the z-axis, the optical beams as they exit their respective optical sources, may not be aligned in the x-axis and/or the y-axis, or have other imperfections in their beam characteristics that require correction. This results in reference patterns and beam spacing that is irregular which leads to imperfections in the scan pattern from the LIDAR system. The present disclosure addresses the above issues associated with optical beam alignment and correction by adjusting each optical beam to fit a pattern prior to reaching the output lens. This enhances system performance by adjusting or tuning out optical source and path imperfections that would create angular errors in the scan pattern resulting in inaccurate scan data. In one example, the present disclosure aligns collimated optical beams by detecting beam characteristics, such as relative positions or angles, of each optical beam on an optical sensor. An optics controller receives data from the sensor about the location of the optical beams on the sensor and checks that data against desired beam characteristics, such as an optical reference pattern. The optics controller based on the data send a signal to alignment optics located between the sensor and the optical sources. The signal causes the alignment optics to change position (e.g., pitch and yaw of each optic) to adjust and correct each optical beam imaged on the sensor to match the desired beam characteristic, such as the reference pattern.

The alignment of the optical beams may correct for and reduce aberrations and angular separation between the optical beams at the output lens.

FIG. 1 illustrates a LIDAR system 100 according to example implementations of the present disclosure. The LIDAR system 100 includes one or more of each of a number of components, but may include fewer or additional components than shown in FIG. 1. One or more of the components depicted in FIG. 1 can be implemented on a photonics chip, according to some embodiments. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles along an axis (e.g., a fast-axis).

In some examples, the LIDAR system 100 includes an optical scanner 102 that includes one or more scanning mirrors that are rotatable along an axis (e.g., a slow-axis) that is orthogonal or substantially orthogonal to the fast-axis of the diffractive element to steer optical signals to scan an environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LIDAR control systems 110 may include a signal processing unit 112 such as a DSP. The LIDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LIDAR control systems 110 are also configured to output digital control signals for the optical scanner 102. A motion control system 105 may control the galvanometers of the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some examples, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LIDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110. In some examples, the signals from the optical receivers 104 may be subject to signal conditioning by signal conditioning unit 107 prior to receipt by the LIDAR control systems 110. For example, the signals from the optical receivers 104 may be provided to an operational amplifier for amplification of the received signals and the amplified signals may be provided to the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LIDAR control systems 110. The LIDAR control systems 110 instruct, e.g., via signal processor unit 112, the optical drivers 103 to independently modulate one or more optical beams, and these modulated signals propagate through the optical circuits 101 to the free space optics 115. The free space optics 115 directs the light at the optical scanner 102 that scans a target environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LIDAR system 100 may have natural reflective properties or a reflective coating to reflect a portion of the light back to the optical circuits 101.

Optical signals reflected back from an environment pass through the optical circuits 101 to the optical receivers 104. Because the polarization of the light has been transformed, it may be reflected by a polarization beam splitter along with the portion of polarized light that was reflected back to the optical circuits 101. In such scenarios, rather than returning to the same fiber or waveguide serving as an optical source, the reflected signals can be reflected to separate optical receivers 104. These signals interfere with one another and generate a combined signal. The combined signal can then be reflected to the optical receivers 104. Also, each beam signal that returns from the target environment may produces a time-shifted waveform. The temporal phase difference between the two waveforms generates a beat frequency measured on the optical receivers 104 (e.g., photodetectors).

The analog signals from the optical receivers 104 are converted to digital signals by the signal conditioning unit 107. These digital signals are then sent to the LIDAR control systems 110. A signal processing unit 112 may then receive the digital signals to further process and interpret them. In some embodiments, the signal processing unit 112 also receives position data from the motion control system 105 and galvanometers (not shown) as well as image data from the image processing system 114. The signal processing unit 112 can then generate 3D point cloud data that includes information about range and/or velocity points in the target environment as the optical scanner 102 scans additional points. The signal processing unit 112 can also overlay 3D point cloud data with image data to determine velocity and/or distance of objects in the surrounding area. The signal processing unit 112 also processes the satellite-based navigation location data to provide data related to a specific global location.

Figure 2:
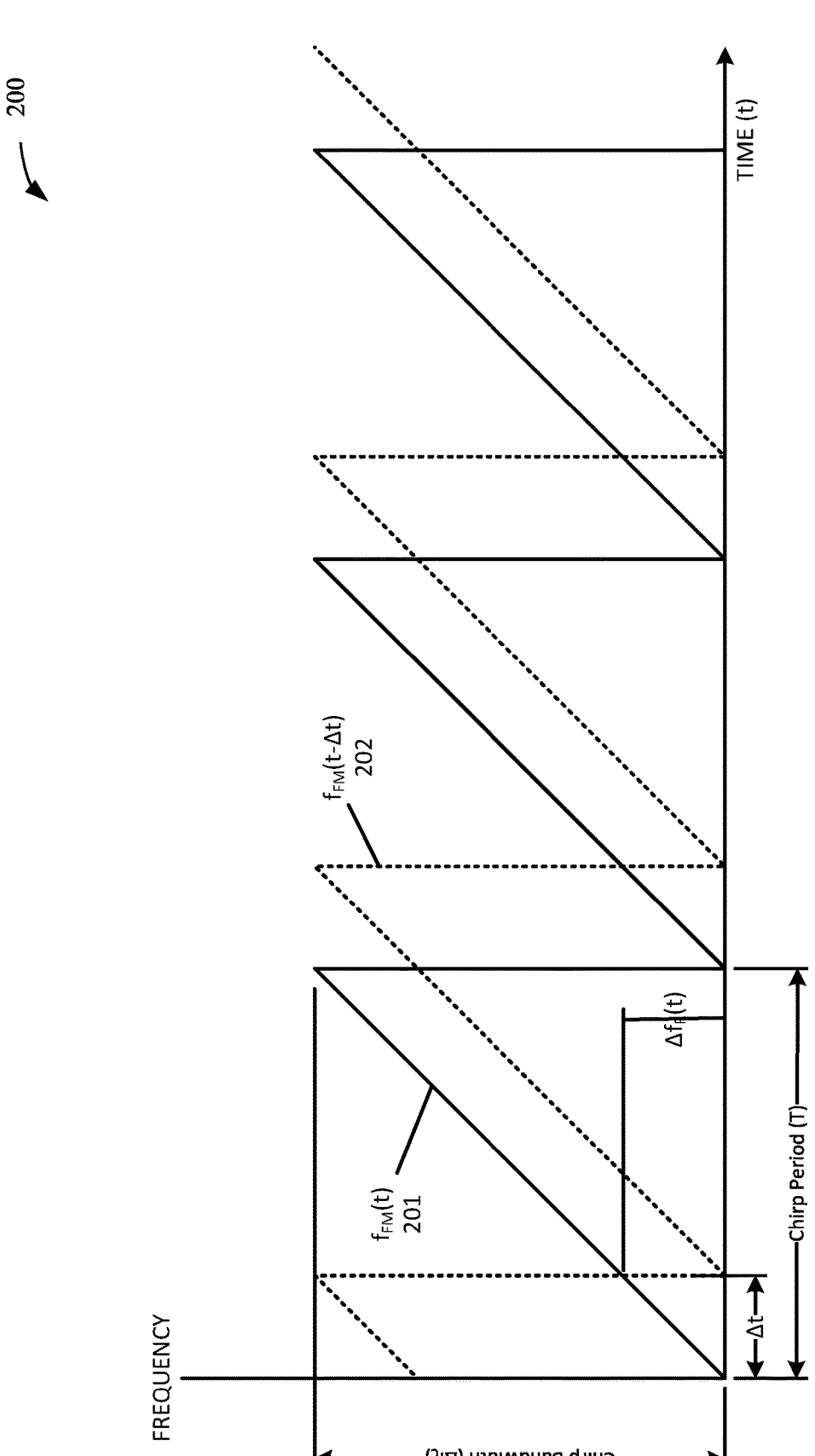
FIG. 2 is a time-frequency diagram of an FMCW scanning signal that may be used by a LIDAR system to scan a target environment, according to some embodiments.

FIG. 2 is a time-frequency diagram 200 of an FMCW scanning signal 201 that may be used by a LIDAR system, such as the LIDAR system 100, to scan a target environment according to some embodiments. In one example, the FMCW scanning signal 201, labeled as fFM(t), is a sawtooth waveform (sawtooth "chirp") with a chirp bandwidth ΔfC and a chirp period TC. The slope of the sawtooth is given as k=(ΔfC/TC). FIG. 2 also depicts target return signal 202 according to some embodiments. Target return signal 202, labeled as fFM(t−Δt), is a time-delayed version of the FMCW scanning signal 201, where Δt is the round trip time to and from a target illuminated by FMCW scanning signal 201. The round trip time is given as Δt=2R/v, where R is the target range and v is the velocity of the optical beam, which is the speed of light c. The target range, R, can therefore be calculated as R=c(Δt/2). When the target return signal 202 is optically mixed with the scanning signal, a range dependent difference frequency ("beat frequency") ΔfR(t) is generated. The beat frequency ΔfR(t) is linearly related to the time delay Δt by the slope of the sawtooth k. That is, ΔfR(t)=kΔt. Since the target range R is proportional to Δt, the target range R can be calculated as R=(c/2)(ΔfR(t)/k). That is, the range R is linearly related to the beat frequency ΔfR(t). The beat frequency ΔfR(t) can be generated, for example, as an analog signal in optical receivers 104 of LIDAR system 100. The beat frequency can then be digitized by an analog-to-digital converter (ADC), for example, in a signal conditioning unit such as signal conditioning unit 107 in the LIDAR system 100. The digitized beat frequency signal can then be digitally processed, for example, in a signal processing unit, such as signal processing unit 112 in the LIDAR system 100. It should be noted that the target return signal 202 will, in general, also includes a frequency offset (Doppler shift) if the target has a velocity relative to the LIDAR system 100. The Doppler shift can be determined separately, and used to correct the frequency of the return signal, so the Doppler shift is not shown in FIG. 2 for simplicity and ease of explanation. It should also be noted that the sampling frequency of the ADC will determine the highest beat frequency that can be processed by the system without aliasing. In general, the highest frequency that can be processed is one-half of the sampling frequency (i.e., the "Nyquist limit"). In one example, and without limitation, if the sampling frequency of the ADC is 1 gigahertz, then the highest beat frequency that can be processed without aliasing (ΔfRmax) is 500 megahertz. This limit in turn determines the maximum range of the system as Rmax=(c/2)(ΔfRmax/k) which can be adjusted by changing the chirp slope k. In one example, while the data samples from the ADC may be continuous, the subsequent digital processing described below may be partitioned into "time segments" that can be associated with some periodicity in the LIDAR system 100. In one example, and without limitation, a time segment might correspond to a predetermined number of chirp periods T, or a number of full rotations in azimuth by the optical scanner.

Figure 3:
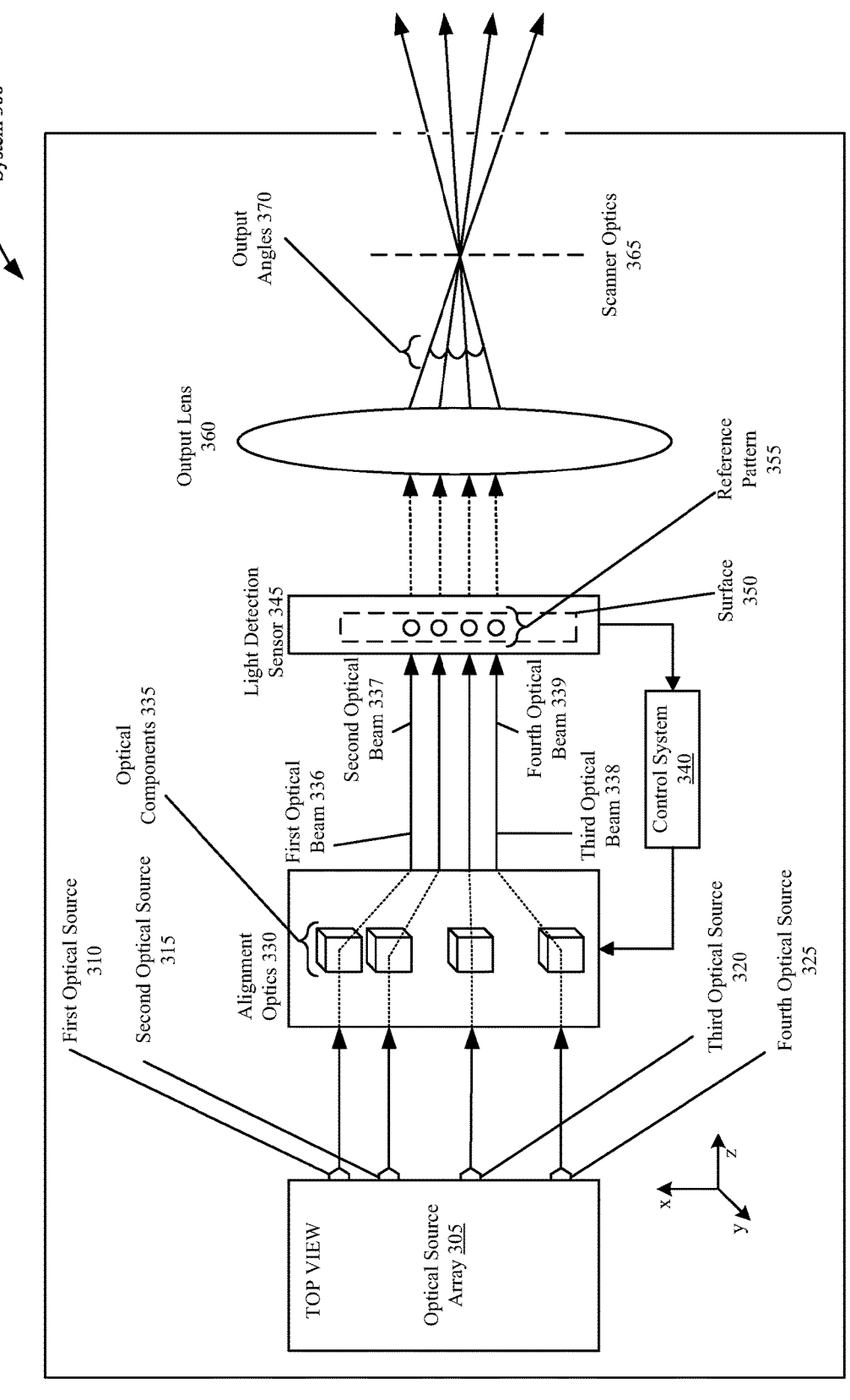
FIG. 3 illustrates an example optical alignment system to align and collimate one or more optical beams provided to a single output collimating lens.

FIG. 3 illustrates an example optical alignment system 300 to align and collimate one or more optical beams provided to a single output collimating lens, according to some embodiments. Optical alignment system 300 includes an optical source array 305, alignment optics 330, control system 340, light detection sensor 345, and an output lens 360. In some embodiments, some or all of these components may be found and used in the LIDAR system 100 (e.g., t e control system 340 may be included in LIDAR control systems 110 and so forth).

The optical source array 305 may include one or more optical sources, such as optical source 310, optical source 315, optical source 320, and optical source 325. In some embodiments, an optical source may include, but is not limited to, a light emitter (e.g. a laser, photon source, beam splitter, optical fiber, and the like) As discussed herein and shown in FIG. 3, the optical sources 310-325 may not be evenly spaced in either the x-axis, as shown, or the y-axis (out of the page, not shown). For simplicity and illustration, the optical sources 310-325 have a large position differential on the x-axis, however, the position differential may be very small and may also be in the y-axis.

In contrast to the described embodiments, conventional systems often implement optical sources in a manner that causes an irregular reference pattern that creates output angles that are non-uniform through scanner optics, such as one or more galvo mirrors to scan a field of view (FOV) of a particular system. For instance, in one embodiment, optical beams may be aligned according to one or more beam characteristics (e.g., reference pattern 355) by using alignment optics 330, the light detection sensor 345 and the control system 340. The alignment optics 330 may receive optical beams from optical source array 305. The alignment optics 330 include optical components 335. In this example, there is an optical component, as shown, for each optical beam. In various embodiments, the optical components 335 may be tilted and rotated along any axis, together or individually, by such apparatuses as a tilt table or other mechanical or electromechanical devices (not shown), such that at the exit of the alignment optics 330 the optical beam 336, the optical beam 337, the optical beam 338, and the fourth optical beam 339 change position relative to each other and their original path. For illustrative purposes four optical beams are shown, however, the number of beams is not limiting, and in various other embodiments there may be one optical beam, two optical beams up to "n" optical beams.

The optical beam 336, the optical beam 337, the optical beam 338, and the fourth optical beam 339 may form an image on the surface 350 of the light detection sensor 345. The light detection sensor 345 may be any device that may detect an optical beam, which may include, among other things, detecting optical beam characteristics, such as each optical beam's location (e.g., Cartesian coordinates) on the surface 350, optical power, centroid, angle of incidence, or other optical characteristics. The control system 340 is connected to the light detection sensor 345 and may receive information corresponding to one or more optical beam characteristics. For example, the control system 340 may receive the coordinates for the location of each optical beam on the surface 350 and compare those coordinates to the coordinates of a reference pattern imaged on the surface 350. In one embodiment, the comparison is used to determine a difference between a reference position and a detected position based on the coordinates for each optical beam and corresponding coordinates of the reference pattern 355 on the surface 350. The control system 340 may, based on the coordinate comparison, provide one or more signals to adjust (e.g., tilt, rotate, etc.) the alignment optics 330 to shift the optical beam 336, the optical beam 337, the optical beam 338, and the fourth optical beam 339 image on the surface 350 to align with the reference pattern 355. In other examples, the reference pattern 355 may include other target reference characteristics for comparison, such optical power, centroid, beam angle (e.g., relative to surface 350), or other optical characteristics.

Thus, shifting the optical beams 336-339, according to embodiments, to place them into alignment according to the reference pattern 355 may provide for smaller decenter of each of the optical beams 336-339 at the output lens 360, resulting in smaller output angles 370 between the optical beams without changing the focal length of the output lens 360.

Additionally, the amount the optical beams 336-339 are shifted at the output lens 330 according to the alignment determines the output angles 370 at which the optical beams 336-339 will be transmitted from the optical alignment system 300. The output angles 370 may also depend on the focal length of the output lens 360. For example, the output angle separation between beams may be calculated from equation (1) below:

$$\theta = \arctan\left(\frac{\frac{pitch}{n}}{FL}\right) \tag{1}$$

where θ is an output angle of the output angles 370 between optical beams, pitch is the spacing between the alignment of the optical beams, n is the number of optical beams, and FL is the focal length of the output lens 370. The reduced pitch between the optical beams may provide for an output angle of less than two degrees. In some embodiments, the reduced pitch may provide for an output angle of less than one degree.

Figure 4A:
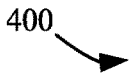
FIG. 4A illustrates an alignment including an example of the optical beams aligning to an image pattern on a surface of a sensor.

FIG. 4A illustrates an alignment 400 including an example of the optical beams aligning to an image pattern on a surface of a sensor, for example, surface 350 of light detection sensor 345 of FIG. 3, according to some embodiments of the present disclosure. Surface 405A illustrates optical beams 410A, for example optical beams 336-339 of FIG. 3, and their relative position and alignment to each other on x-axis and y-axis of the surface 405A.

Surface 405B is an example of the optical beams 410A as compared to the reference pattern 355. As illustrated, the optical beams 410A are not in alignment with the reference pattern compared to by the control system 340, as discussed with respect to FIG. 3.

Surface 405C illustrates the aligned optical beams 410C, which are the output of the alignment optics 330 when shifted by the control system 340 in response to the comparing of the optical beams 410A to the reference pattern 355.

Figure 4B:
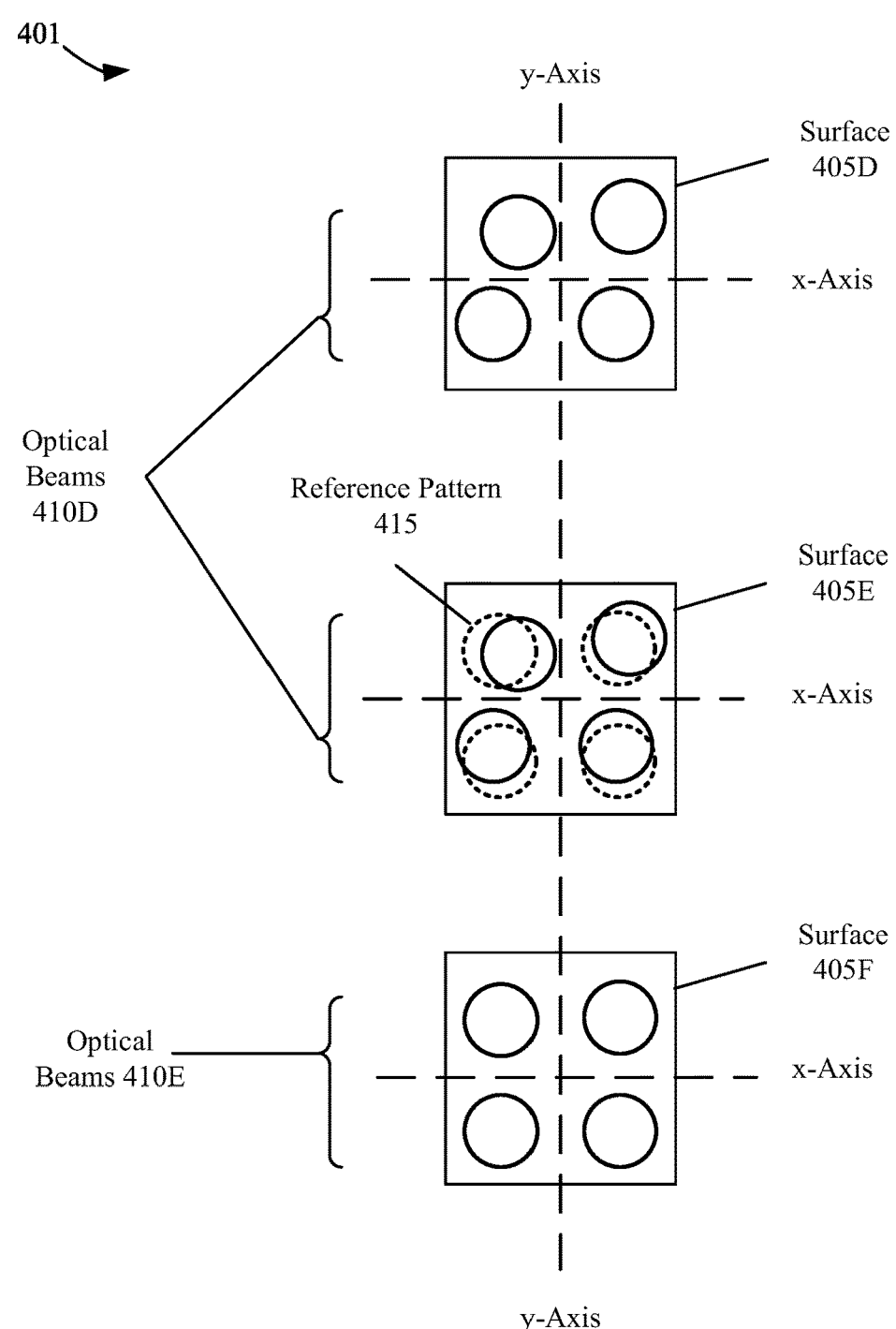
FIG. 4B illustrates an alignment including an example of the optical beams aligning to a coplanar image pattern on a light detection sensor.

FIG. 4B illustrates an alignment 401 including an example of the optical beams, for example optical beams 336-339 of FIG. 3, aligning to a coplanar image pattern (e.g., circle, square or rectangle pattern in the same plane) on the surface of the sensor (e.g., light detection sensor 345 of FIG.

3), according to embodiments of the present disclosure. Surface 405D illustrates optical beams 410D and their relative position and alignment to each other on x-axis and y-axis of the surface 405D.

Surface 405E is an example of the optical beams 410D as compared to a reference pattern 415. As illustrated, the optical beams 410D are not in alignment with the reference pattern 415. In a similar fashion to FIGS. 3 and 4A, the control system 340 may compare the reference pattern 415 to the optical beams 410D on surface 405E and communicate signals to the alignment optics 330 to shift the optical beams 410D to align with the reference pattern 415 on the image plane, as illustrated by optical beams 410E on surface 405F.

The alignment to a reference pattern may be performed on a single optical beam up to "n" optical beams, and affect one or both optical beam positions on the x-axis and the y-axis. A linear and square reference pattern have been detailed here by way of example, however, any shape may be used to align the optical beams using a similar method. As discussed above with reference to FIG. 3, shifting the optical beams (e.g. optical beams 336-339), according to embodiments, to place them into alignment according to a reference pattern (e.g., reference pattern 355) may provide for smaller decenter of each of the optical beams at the output lens (e.g. output lens 360), resulting in smaller output angles (e.g., output angles 370) between the optical beams without changing the focal length of the output lens 360.

Figure 5:
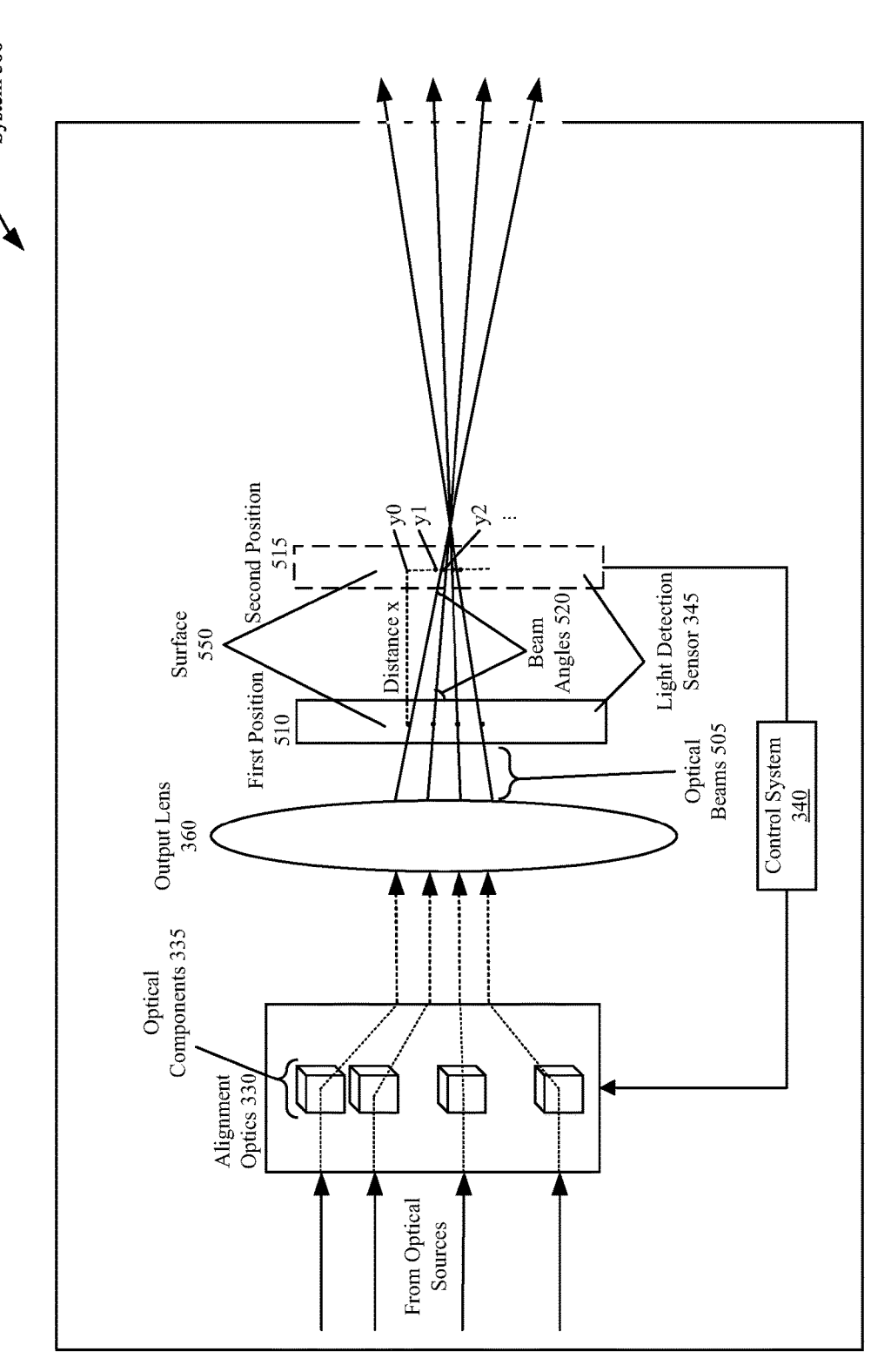
FIG. 5 illustrates an example optical alignment system to align one more optical beams provided to a single output collimating lens.

FIG. 5 illustrates an example optical alignment system 500 to align one more optical beams provided to a single output collimating lens, according to some embodiments. For simplicity, the optical source components have been omitted and would be similar or the same to the optical sources of FIG. 3. The optical alignment system 500 includes alignment optics 330, control system 340, light detection sensor 345, and an output lens 360.

Similar to FIG. 3, the optical beams form an image on the Surface 550 of the light detection sensor 345 and the control system 340 is used to shift the optical beams 505 according to one or more beam characteristics. However, in this example, the light detection sensor 345 is located on the output side of the output lens 360 to acquire two beam images of optical beams 505 at different locations. For example, the light detection sensor 345 is positioned at position 510 for an image of optical beams 505 and moved to a position 515 for a second image of optical beams 505. The control system 340 receives the coordinates of each optical beam's location of the optical beams 505 (e.g., coordinates) on the surface 550 for the position 510 and the position 515. Using those location coordinates, the control system 340 may determine beam angles 520 based on a distance between position 510 and position 515, and distance between the image locations at position 510 and position 515 for each optical beam (see e.g., y0, y1, and y2 in FIG. 5). The angles determined by the control system 340 are associated with the optical reference pattern of the optical beams 505. Accordingly, the control system 340 may provide one or more signals to adjust (e.g., tilt, rotate, etc.) the alignment optics 330 to alter each optical beam of optical beams 505 until the angles as determined by the light detection sensor 345 and the control system 340 are within a specified tolerance.

FIG. 6 is a flow diagram of an example method 600 for utilizing components of a LIDAR system (e.g., LIDAR system 100 and optical alignment system 300). Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 600 may be performed by control system 340 and light detection sensor 345 of FIG. 3.

With reference to FIG. 6, method 600 illustrates example functions used by various embodiments. Although specific function blocks ("blocks") are disclosed in method 600, such blocks are examples. That is, embodiments are well suited to performing various other blocks or variations of the blocks recited in method 600. It is appreciated that the blocks in method 600 may be performed in an order different than presented, and that not all of the blocks in method 600 may be performed.

Method 600 begins at block 610, where the processing logic receives an archive file comprising an archive start point and an archive end point.

At block 620, the processing logic compares one or more optical characteristics of a first optical beam and a second optical beam to one or more corresponding target reference characteristics associated with a reference pattern.

At block 630, the processing logic causes a shift of the first optical beam and the second optical beam on a light detection sensor to align with the reference pattern in response to the comparing the optical characteristics.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. An optical scanning system, comprising:
a plurality of optical sources to generate a plurality of optical beams; and
at least one optical component adjustable to shift the plurality of optical beams to align with a reference output beam pattern prior to propagating the plurality of optical beams to output scanning optics.

2. The optical scanning system of claim 1, further comprising:
a light sensor at an output image plane to detect an initial output beam pattern of the plurality of optical beams, wherein the at least one optical component is configured to shift the plurality of optical beams from the initial output beam pattern to the reference output beam pattern.

3. The optical scanning system of claim 2, further comprising:
a control system, comprising one or more processors, operatively coupled to the at least one optical component and the light sensor, wherein the control system provides one or more signals to the at least one optical component to align the plurality of optical beams according to the reference output beam pattern to produce a scan pattern.

4. The optical scanning system of claim 3, wherein the reference output beam pattern comprises coordinates on the light sensor corresponding to a reference position for each optical beam of the plurality of optical beams.

5. The optical scanning system of claim 3, wherein the control system coupled to the light sensor is further to determine coordinates corresponding to a detected position of each optical beam of the plurality of optical beams at the light sensor.

6. The optical scanning system of claim 5, wherein the control system is further to:
determine a difference between a reference position for each optical beam of the plurality of optical beams and the detected position of each optical beam of the plurality of optical beams; and
shift each optical beam to align with the reference position.

7. The optical scanning system of claim 2, wherein the at least one optical component comprises a first optical component to shift a first optical beam of the plurality of optical beams and a second optical component to shift a second optical beam of the plurality of optical beams in response to at least one control signal.

14

8. A method, comprising:
generating, by a plurality of optical sources, a plurality of optical beams;
transmitting the plurality of optical beams towards an output lens; and
shifting, by an optical component, at least one optical beam of the plurality of optical beams to align with a reference output beam pattern prior to propagating the at least one optical beam to output scanning optics.

9. The method of claim 8, further comprising:
detecting, by a light sensor at an output image plane, an initial output beam pattern of the plurality of optical beams, wherein the optical component is configured to shift the plurality of optical beams from the initial output beam pattern to the reference output beam pattern.

10. The method of claim 9, wherein the reference output beam pattern comprises coordinates on the light sensor corresponding to a reference position for each optical beam of the plurality of optical beams.

11. The method of claim 9, further comprising:
determining coordinates corresponding to a detected position of each optical beam of the plurality of optical beams at the light sensor.

12. The method of claim 11, further comprising:
determining a difference between a reference position for each optical beam of the plurality of optical beams and the detected position of each optical beam of the plurality of optical beams; and
shifting each optical beam of the plurality of optical beams to align with the reference position for each optical beam of the plurality of optical beams based on the difference.

13. The method of claim 8, wherein shifting the at least one optical beam of the plurality of optical beams further comprises:
providing one or more signals to a first optical component for shifting a first optical beam of the plurality of optical beams and to a second optical component for shifting a second optical beam of the plurality of optical beams.

14. The method of claim 8, further comprising:
detecting, by a second light sensor, a final output beam pattern, wherein the second light sensor is disposed after the output lens.

15. A light detection and ranging (LIDAR) system, comprising:
a plurality of optical sources to generate a plurality of optical beams directed toward an output lens; and
LIDAR control circuitry optically coupled to the plurality of optical sources, the LIDAR control circuitry to shift at least one of the plurality of optical beams to align with a reference output beam pattern at an image plane prior to propagating to output scanning optics.

16. The LIDAR system of claim 15, wherein the LIDAR control circuitry further comprises:
a light sensor at an output image plane to detect an initial output beam pattern of the plurality of optical beams.

17. The LIDAR system of claim 16, wherein the LIDAR control circuitry is further to:
determine coordinates corresponding to a detected position of each optical beam of the plurality of optical beams at the light sensor.

18. The LIDAR system of claim 17, wherein the LIDAR control circuitry is further to:
determine a difference between a reference position for each optical beam of the plurality of optical beams and the detected position of each optical beam of the plurality of optical beams; and shift each optical beam to align with the reference position based on the difference.

19. The LIDAR system of claim 15, further comprising:

alignment optics to shift the plurality of optical beams according to the reference output beam pattern at the image plane.

20. The LIDAR system of claim 15, further comprising:

a first optical component to shift a first optical beam of the plurality of optical beams and a second optical component to shift a second optical beam of the plurality of optical beams in response to at least one control signal from the LIDAR control circuitry.

* * * * *